Dec. 27, 1960  D. S. CRUICKSHANK  2,966,188
ANTI-SKID CHAIN FOR VEHICLES
Filed May 20, 1959  2 Sheets-Sheet 1

*INVENTOR.*
DAVID S. CRUICKSHANK
BY
*Barlow & Barlow*
ATTORNEYS

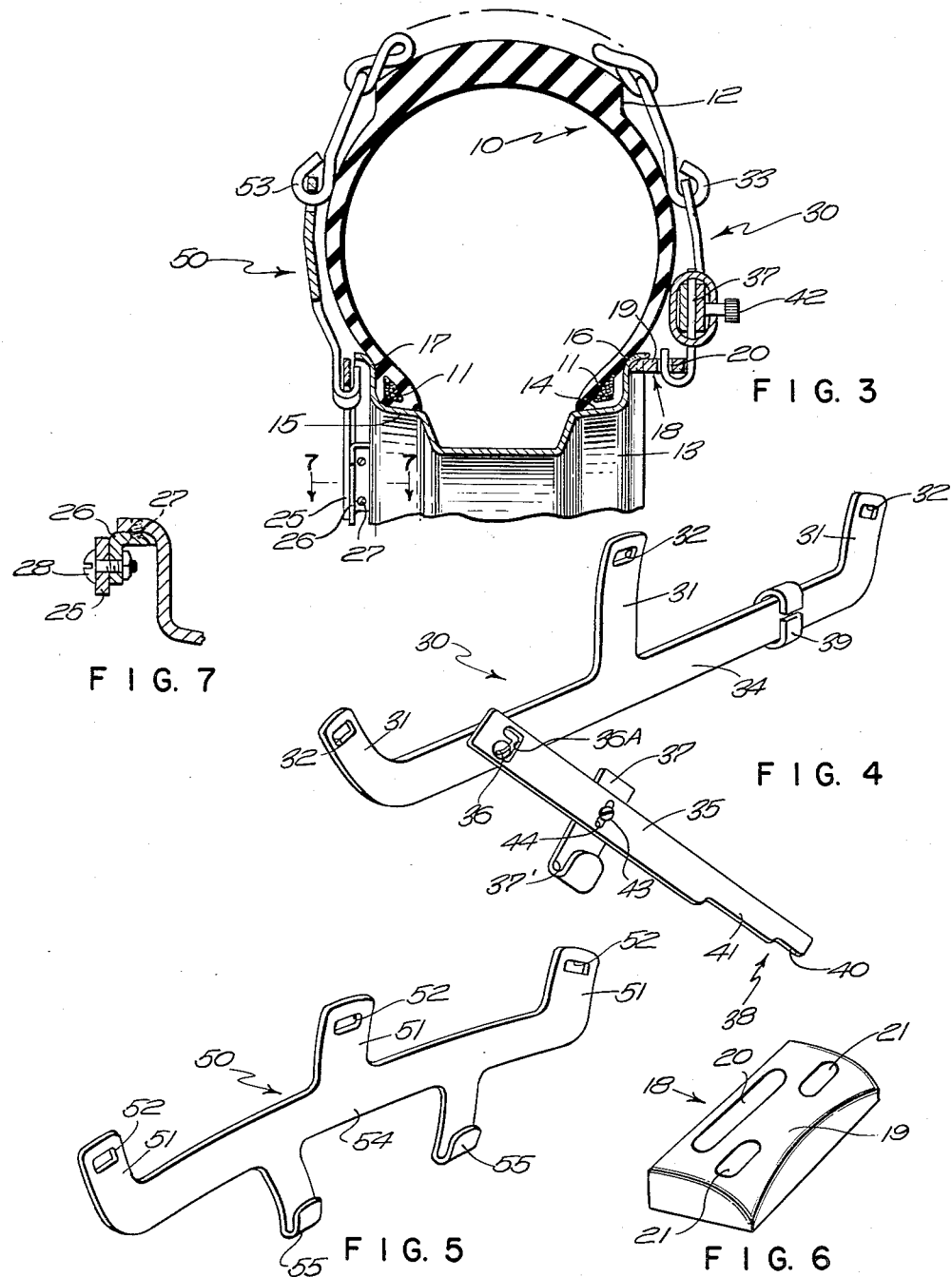

United States Patent Office 2,966,188
Patented Dec. 27, 1960

2,966,188

ANTI-SKID CHAIN FOR VEHICLES

David S. Cruickshank, 690 E. 26th St., Paterson, N.J.

Filed May 20, 1959, Ser. No. 814,483

5 Claims. (Cl. 152—236)

This invention relates to an anti-skid chain for the pneumatic tires of a vehicle and in particular it relates to an anti-skid device and the anchoring means therefor to hold the anti-skid device in place upon the tire.

The standard type of chains heretofore largely employed, which chains extend circumferentially at the side of the tire and are connected across the tread by cross-links, do not meet today's modern driving needs. Generally speaking, it is found that chains are necessary for only a small percentage of the driving one would do under adverse conditions, and it becomes annoying, to say the least, to have full or standard chains affixed to one's tires when they are not really needed. Also, to apply such chains to a vehicle tire in a modern automobile, is, at best, a difficult task because of the decrease accessibility of the wheels which makes it desirable that single units of cross links be employed as an anti-skid device. In the past, such anti-skid chains have employed straps which would encircle the tire and the rim thereof, but with the advent of solid disk wheels, it is not possible to attach a single anti-skid strap to a tire because of the lack of an attaching device. Accordingly, efforts have been made to devise suitable ways of attaching separate cross chains or groups of cross chains directly to the periphery of the wheel at points spaced circumferentially thereof and brought to an accessible position by rotation of the wheel.

Accordingly, it is an object of this invention to provide an improved cross chain attaching means which is capable of being economically manufactured and more easily applied to and removed from the wheel in use.

Another object of the invention is to provide an attaching device for the interior portion of the rim of the wheel which may be readily engaged without excessive manipulation and to provide a cooperating means for the exterior portion of the rim of the wheel which will tighten one or more cross-links to the tire.

A further object of the invention is to provide attaching devices which are simple and sturdy in construction and which are adapted to remain on the wheels during prolonged periods when anti-skid protection is potentially needed without interfering with operation of the vehicle and which may be readily removed when the anti-skid protection need passes.

With these and other objects in view, the invention consists of certain novel features of construction as will be more fully described and particularly pointed out in the appended claims.

In the accompanying drawings:

Figure 3 is a transverse sectional view of the rim and tire with the anti-skid device of the invention attached thereto;

Figures 4 and 5 are perspective views of the outside attaching bracket and the inside attaching bracket respectively used to fasten the cross-links to the tire;

Figure 6 is a perspecive view of the stirrup fastener; and

Figure 7 is a sectional view through a fastening bracket taken on lines 7—7 of Figure 3.

Figure 1:
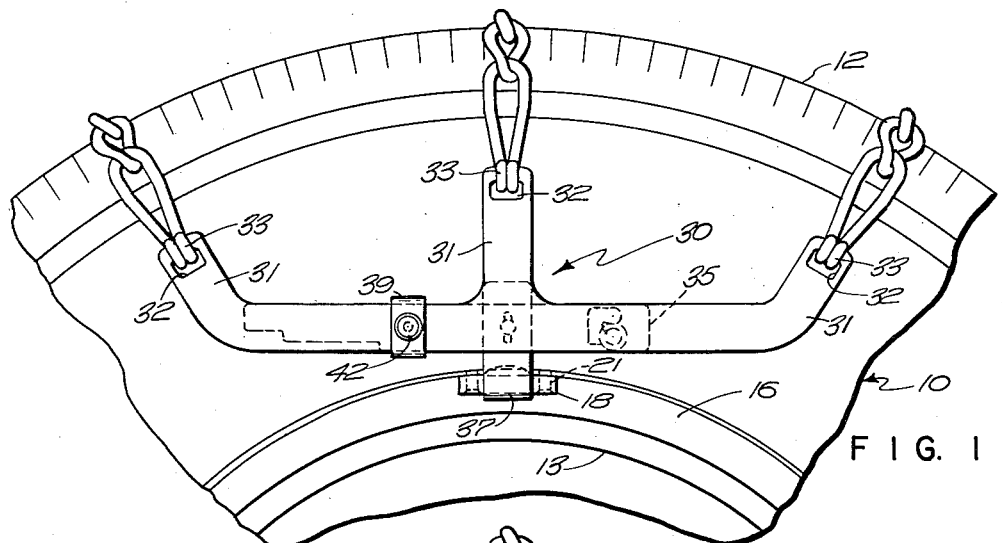
Figure 1 is a portion of a side elevational view of an assembly of a tire rim and the anti-skid chain in combination with the attaching device of the invention as viewed from the outside of a vehicle tire.
Figure 2:
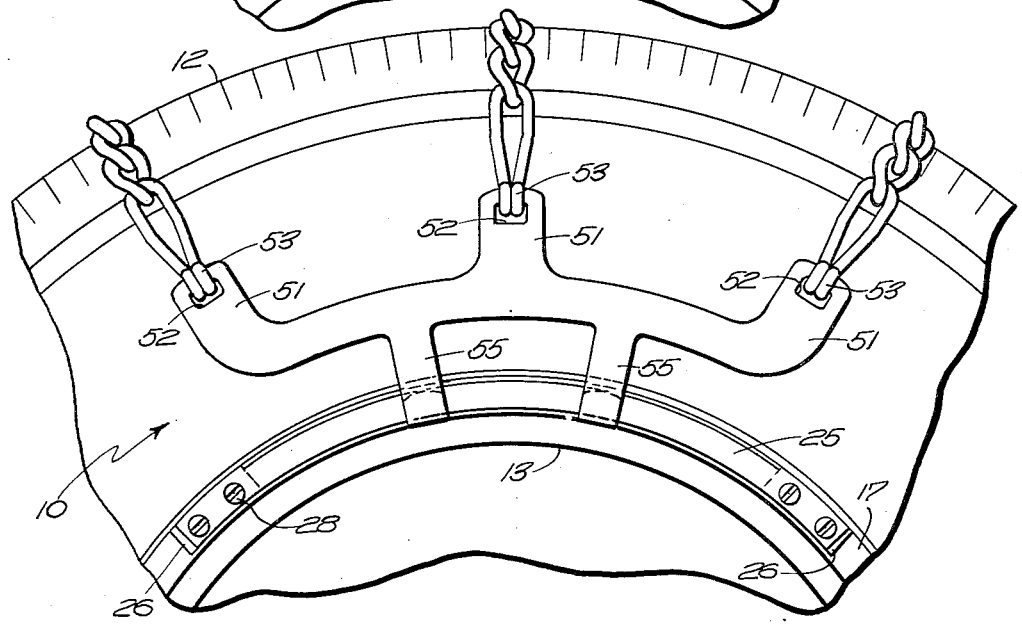
Figure 2 is a similar view looking from the inside portion of the tire.

In proceeding with this invention, there is provided a fastening device for the inside rim portion of the tire and a separate type of fastening device for the outside portion of the rim of the tire. Cooperating with these fastening devices are metal frames which carry means associated therewith to permit the attachment of the anti-skid chains in the form of chain links. The fastening device for the inside portion of the tire which is least accessible comprises essentially an arcuate anchoring ring which is suitably affixed to the rim of the wheel and for the outside portion of the rim a stirrup member is provided which may be affixed to the rim in a suitable manner, both of these devices cooperating with the metal frames heretofore mentioned to which the cross-links are attached.

Referring now to the drawings, there is shown a pneumatic tire generally designated 10 which is of conventional construction having bead portions 11 and tread portions 12. The tire 10 is shown in the assembly position on a conventional rim 13 which has bead seats 14, 15 and rim flanges 16 and 17 that have outwardly extending lips. The fastening device for attaching the chain cross-link assemblies to the rim comprises two separate parts: one for the outer portion of the rim and one for the inner portion of the rim. The device used for the outer portion of the rim consists of a stirrup 18 (see Fig. 6) which has a portion at 19 suitably curved to conform to and firmly engage the outer side of the rim edge at the outwardly curved rim portion 16 and a slot 20 into which the metal frame carrying the cross-links may engage. This stirrup is formed with two elongated holes 21 through which a fastening means in the form of a stove bolt or the like may pass, the outwardly tapering portion of the rim being suitably drilled and tapped to receive these bolts. Preferably, this stirrup part 18 may be a die cast item that is cast from a light and yet strong metal material such as an aluminum or magnesium alloy so that very little weight is added to the rim and tire assembly when such a fastening device is affixed thereto.

A fastening device for the interior portion of the rim consists generally of an arcuate anchoring ring 25 which is formed on a radius equal to the radius of the rim flange 17. This anchoring ring 25 is suitably secured to the rim flange 17 and in the present instance is shown as being secured thereto by an angle bracket 26 which is provided with two holes for receiving bolts 27 or the like that will engage in tapped holes that have been formed in the rim flange 17 (see Fig. 7). Similarly, the bracket 26 is formed with another pair of holes for receiving fastening means 28 for securing the anchoring ring 25 thereto.

It is intended that these fastening means just described remain on the rim during the season where emergency chains are desired and are needed. To this end, it is generally thought desirable to use three sets of emergency chains and therefore three sets of brackets will be permanently attached to the rim as just described. Accordingly, it is feasible to remove the wheel from the axle and select three sets of points approximately 120° apart to which the stirrup member 18 will be affixed first by drilling the pair of holes in the rim lip 16, then tapping the holes and finally affixing the stirrup permanently to the rim lip. Similarly, and in alignment with the three locations previously chosen, the anchoring rings are affixed to the other side of the rim so that the central portion thereof generally lines up with the location of the stirrup member. This can readily be done in the same fashion by drilling and tapping holes in the rim and permanently attaching this arcuate strap to the inner portion of the rim. The tire may now be replaced on the wheel axle and is in a condition to receive the emergency tire chains which will now be described.

The emergency tire chains consist of a pair of frames which are generally illustrated in Figures 4 and 5. Each bracket is arranged to be used at one side of the rim in conjunction with the fastening means and are adapted to mount two or more cross-links. The frame 30 which is shown in perspective in Figure 4 has a plurality of arms 31 which terminate with cutout portions 32 into which the hook end 33 of a cross-link may be fastened. Each of the arms 31 are joined together by a strap portion 34 and to this strap portion 34 there is pivoted an arm 35 as at 36. This arm 35 is provided somewhat centrally thereof with a strap 37 having a hook end 37' which is adapted to engage the slot 20 in the stirrup 18. The strap 37 may be adjusted relative to the arm 35 by sliding its fastening bolt 43 in the slot 44 or by any other suitable means for a purpose which will presently appear. This arm 35 pivots to generally align itself with the portion 34 and has at the end thereof a reduced portion generally designated 38. When the arm 35 is pivoted to generally align with the portion 34, the collar 39 may be slipped over the end of the arm 35 and engage either at the level 40 or at the level 41, the part 39 then being clamped in position by a thumb screw arrangement 42 (see Fig. 3).

The other frame genrally designated 50 and shown in perspective in Figure 5 similarly consists of at least two means for fastening the end of cross-links thereto and in the present instance to complement the bracket 30 has three arms 51, the ends of which are provided with apertures 52 for the reception of the hook ends 53 of the cross-link. An arm 54 joins the arms 51 together into a common unit and has depending therefrom two hook portions 55 which engage the anchoring ring 25.

With cross-links, such as generally illustrated in the drawing, affixed between the two apertures 52 and 32 of the strap members, a completed unit is provided for any tire. To attach this assembly, it is merely necessary to drape the frame 50 on the reverse side of the tire and with very little manipulation the hook members 55 can be made to engage the anchoring ring 25. This operation is greatly facilitated because of the large radial extent of the anchoring ring 25 with respect to the spacing between the hook members 55. Then the front frame 30 is merely brought down toward the center of the wheel and the arm 35 released so that the hook member 37 can engage the slot 20 in the stirrup 18. The arm 35 is then swung upwardly to tighten the cross-links the desired degree and the clamping member 39 may then be slid over the end of the arm 35 and tightened in place by means of a thumb screw 42. The degree that the band 39 slides over the end of the arm 35 will govern the degree of tightness of the chain over the tire, and a further adjustment may be effected by changing the position of hook 37 relative to the arm 35 through the slot and screw arrangement. Still further adjustment may be facilitated by the double key hole slot 36A which permits two pivoting positions of arm 35 on the pivot point 36. Accordingly, by this arrangement the anti-skid member can be pulled tightly in place and held securely in that position.

I claim:

1. In combination with a pneumatic tire and a rim having spaced flanges that lie alongside the tire walls, said flanges being formed with axially outwardly extending lips and an anti-skid member for the tire, anchoring means for said member comprising an arcuate anchoring member following said flange for a portion of its extent and spaced axially of said lips with brackets extending axially and secured on one side of said rim to the inner surface of the lip and a stirrup member mounted on the other side of said rim to the inner surface of the other lip and means for affixing said anti-skid member in its position across the tire to said anchoring means and to the stirrup member.

2. The combination of claim 1 wherein the means for affixing the anti-skid member comprises at least a hook member for engaging said arcuate ring and an adjustable hook member for engaging said stirrup.

3. The combination of claim 1 wherein the means for affixing the anti-skid member comprises a frame connected to each end thereof, one of said frames including a fixed hook member for engaging said arcuate ring, the other of said frames including an adjustable hook member for engaging said stirrup and tightening the anti-skid member into operating position.

4. The combination of claim 3 wherein said adjustable hook member comprises a pivoted arm carrying a hook.

5. In combination with a pneumatic tire and a rim having spaced flanges formed with outwardly extending lips that lie alongside the tire walls and an anti-skid member for the tire, anchoring means for said member, said means comprising a stirrup having one portion thereof formed to nest against one lip of one of the rim flanges and secured thereto, a further portion removed from said first portion having a U-shaped area defining an elongated slot normally lying beyond the said lips, said slot receiving a portion of the anti-skid member to anchor said member to said tire.

References Cited in the file of this patent

UNITED STATES PATENTS

| | | |
|---|---|---|
| 1,478,059 | Pye | Dec. 18, 1923 |
| 2,474,521 | Fogarty | June 28, 1949 |
| 2,631,637 | Purdy | Mar. 17, 1953 |
| 2,778,400 | Charlton | Jan. 22, 1957 |
| 2,801,668 | Mosca | Aug. 6, 1957 |